United States Patent
Charnesky et al.

(10) Patent No.: US 8,708,078 B2
(45) Date of Patent: Apr. 29, 2014

(54) FLEXIBLE DRIVE ELEMENT FOR AN ANGLED ACTIVE SHUTTER

(75) Inventors: Scott P. Charnesky, Birmingham, MI (US); Brain D. Van Buren, Shelby Township, MI (US); Richard J. Skurkis, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 131 days.

(21) Appl. No.: 12/759,057

(22) Filed: Apr. 13, 2010

(65) Prior Publication Data

US 2011/0247779 A1    Oct. 13, 2011

(51) Int. Cl.
*B60K 11/08*    (2006.01)

(52) U.S. Cl.
USPC .............. 180/68.4; 454/75; 454/266; 49/77.1

(58) Field of Classification Search
USPC .............. 180/68.4; 454/75, 265–268; 165/44; 49/74.1–92.1
See application file for complete search history.

(56) References Cited

U.S. PATENT DOCUMENTS

| 3,635,049 A | 1/1972 | Schlotmann et al. |
| 7,866,737 B2 * | 1/2011 | Browne et al. ............. 296/193.1 |
| 2006/0095178 A1 * | 5/2006 | Guilfoyle et al. ............... 701/36 |

FOREIGN PATENT DOCUMENTS

| AT | 275977 B | 11/1969 |
| CN | 2387292 Y | 7/2000 |
| DE | 19800055 A1 | 7/1999 |
| DE | 19812223 A1 | 9/1999 |
| DE | 10231995 A1 | 1/2004 |
| DE | 102004056328 A1 | 6/2006 |
| DE | 102006021664 A1 | 2/2007 |
| DE | 602004007338 T2 | 3/2008 |
| GB | 2131150 A * | 6/1984 |
| WO | 9947827 A1 | 9/1999 |

* cited by examiner

*Primary Examiner* — Jeffrey J Restifo
*Assistant Examiner* — Erez Gurari
(74) *Attorney, Agent, or Firm* — Quinn Law Group, PLLC

(57) ABSTRACT

A shutter system includes a first louver element having a first pivot axis and a second louver element having a second pivot axis. The first louver element is configured to rotate about the first pivot axis, and the second louver element is configured to rotate about the second pivot axis. The shutter system additionally having a flexible drive element connecting the first louver element and the second louver element to thereby substantially synchronize the rotation of the first and second louver elements.

13 Claims, 2 Drawing Sheets

FLEXIBLE DRIVE ELEMENT FOR AN ANGLED ACTIVE SHUTTER

TECHNICAL FIELD

The invention relates to a shutter having angled pivoting louvers driven by a flexible drive element.

BACKGROUND OF THE INVENTION

A shutter is typically a solid and stable covering for an opening. A shutter frequently consists of a frame and louvers or slats mounted within the frame.

Louvers may be fixed, i.e., having a permanently set angle with respect to the frame. Louvers may also be operable, i.e., having an angle that is adjustable with respect to the frame for permitting a desired amount of light, air, and/or liquid to pass from one side of the shutter to the other. Depending on the application and the construction of the frame, shutters can be mounted to fit within, or to overlap the opening. In addition to various functional purposes, particularly in architecture, shutters may also be employed for largely ornamental reasons.

SUMMARY OF THE INVENTION

A shutter system includes a first louver element having a first pivot axis and a second louver element having a second pivot axis. The first louver element is configured to rotate about the first pivot axis, and the second louver element is configured to rotate about the second pivot axis. The shutter system additionally having a flexible drive element connecting the first louver element and the second louver element to thereby substantially synchronize the rotation of the first and second louver elements.

The shutter system may also include a mechanism configured to select a position for the shutter system between and inclusive of fully opened and fully closed by rotating the first and second louver elements about the respective pivot axes. The shutter system may additionally include a controller configured to regulate the mechanism. The shutter system may be configured to control an airstream through a grille opening in a vehicle. The vehicle may include an internal combustion engine, while the controller may be configured to regulate the mechanism according to a load on the engine.

The engine may be cooled by a fluid circulated through a heat exchanger, and the vehicle may include a sensor adapted to sense a temperature of the fluid and configured to communicate the temperature to the controller. The controller may be configured to regulate the mechanism to cool the fluid circulated through the heat exchanger according to the sensed temperature of the fluid.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
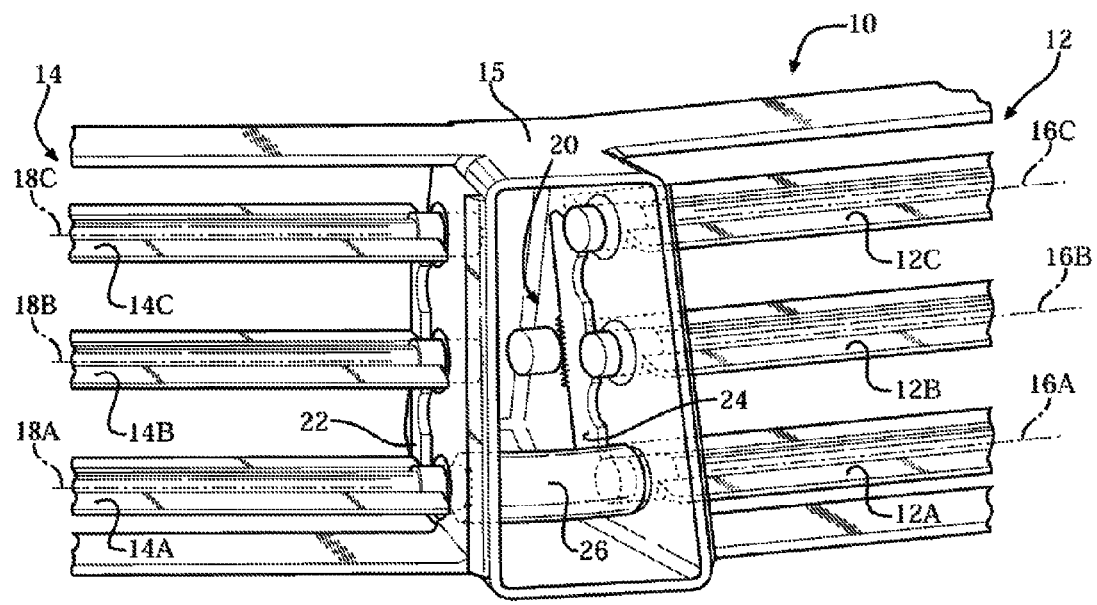
FIG. 1 is a partial perspective view of a shutter system having a flexible drive element.
Figure 2:
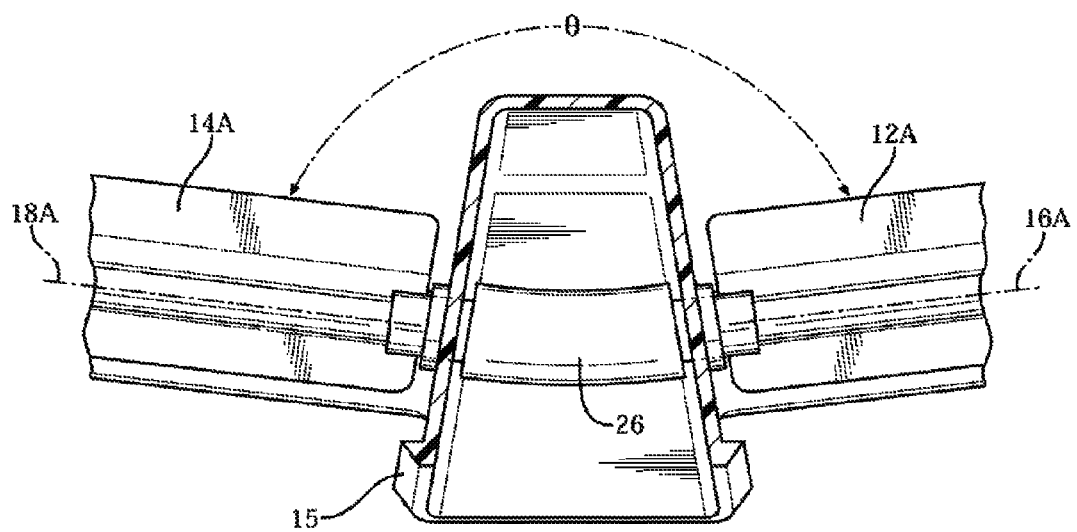
FIG. 2 is a cross-sectional enlarged top view of the shutter system shown in FIG. 1.

Referring to the drawings, wherein like reference numbers refer to like components, FIGS. 1 and 2 show a shutter system 10. Shutter system 10 includes a first set of louvers 12 and a second set of louvers 14. Respective, first and second sets of louvers 12 and 14 are each retained in a rigid frame 15. First set of louvers 12 is disposed at an angle θ relative to the second set of louvers 14. First set of louvers 12 includes three individual louver elements 12A, 12B, and 12C. Second set of louvers 14 similarly includes three individual louver elements 14A, 14B, and 14C. Each respective louver 12A, 12B, and 12C is paired with and disposed at angle θ relative to each respective louver 14A, 14B, and 14C. The number of louvers paired in such fashion within shutter system 10 may be fewer or greater, as required for a specific application.

Each louver 12A-C is characterized by a respective pivot axis 16A-C, and each louver 14A-C is characterized by a respective pivot axis 18A-C. Each louver 12A-C and louver 14A-C is configured to rotate about each respective pivot axis 16A-C and 18A-C, respectively, during operation of the shutter system 10. Shutter system 10 incorporates a mechanism 20 configured to select a desired position for the shutter system between and inclusive of fully opened and fully closed. The mechanism 20 includes separate linkages 22 and 24. Linkages 22 and 24 are configured to rotate louvers 12A-C and 14A-C about pivot axes 16A-C and 18A-C, respectively, in tandem, i.e., substantially in unison, and thus permitting the shutter system 10 to rotate into any of the available positions.

Either linkage 22 or linkage 24 is configured to transfer rotational motion from an external drive source, such as an electric motor (not shown), to a respective set of louvers 12 or 14. A flexible drive element 26 is shown to operatively connect louver 12A with louver 14A, thereby substantially synchronizing the rotation of the first and second louver sets 12 and 14. The flexible drive element 26 is characterized by a lack of moving components. Flexible drive element 26 may be produced from any suitable material, such as a flat-wrap cable conduit, as understood by those skilled in the art, that is capable of withstanding torsional loads that the flexible drive element is likely to see during operation of shutter system 10. Accordingly, mechanism 20 may receive rotational motion only at one of the linkages 22 and 24 in order to select the desired position for the entire shutter system 10, despite the fact that first louver set 12 and second louver set 14 are disposed at angle θ relative to each other.

Figure 3:
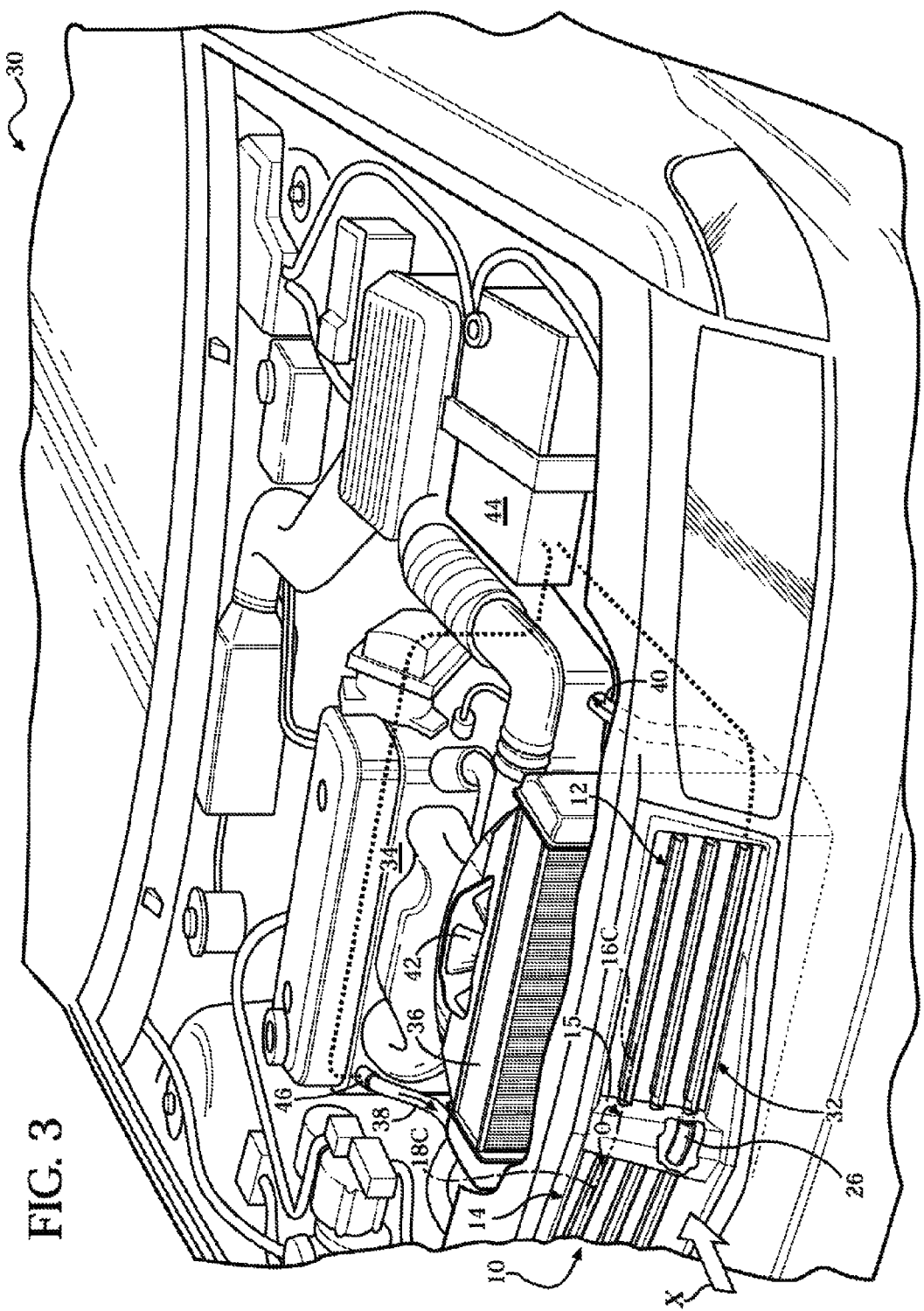
FIG. 3 is a partial perspective view of a vehicle having the shutter system shown in FIGS. 1 and 2.

FIG. 3 depicts shutter system 10 incorporated inside a vehicle 30. As shown shutter system 10 is positioned at a grille opening 32 at the front of the vehicle 30. Vehicle 30 includes an internal combustion engine 34. Also included is an air-to-fluid heat exchanger 36, i.e., a radiator, for circulating a cooling fluid, shown by arrows 38 and 40, such as water or a specially formulated coolant, for cooling engine 34. Heat exchanger 36 is positioned behind the grille opening 32 and behind shutter system 10 for protection of the heat exchanger from various road- and air-borne debris. The heat exchanger 34 may also be positioned in any other location, such as behind a passenger compartment, if, for example, the vehicle has a rear or a mid-engine configuration, as understood by those skilled in the art.

A fan 42 is positioned behind the heat exchanger 36. Fan 42 may be driven either electrically, or mechanically, directly by the engine. Vehicle 30 also includes a controller 44, which may be an engine controller or a separate control unit, configured to regulate mechanism 20 for selecting the desired position of the shutter system 10. Controller 44 may also be configured to operate the fan 42, if the fan is electrically driven, and a thermostat (not shown) that is configured to regulate the circulation of coolant, as understood by those skilled in the art.

Vehicle 30 additionally includes a coolant sensor 46 configured to sense a temperature of the coolant. Controller 44 is programmed to regulate mechanism 20 according to the load on engine 34 and, correspondingly, on the temperature of the coolant sensed by sensor 46. The temperature of the coolant is increased due to the heat produced by engine 34 under load. As known by those skilled in the art, a load on the engine is typically dependent on operating conditions imposed on the vehicle 30, such as going up a hill and/or pulling a trailer. The load on engine 34 generally drives up internal temperature of the engine, which in turn necessitates cooling of the engine for desired performance and reliability.

The coolant is routed inside the engine 34 in order to most effectively remove heat from critical engine components, such as bearings (not shown, but known by those skilled in the art). Typically, the coolant is continuously circulated by a fluid pump (not shown) from engine 34 to heat exchanger 36. In a moving vehicle, an airstream X at ambient temperature and traveling at a certain velocity with respect to the vehicle penetrates the vehicle's grille opening 32. When shutter system 10 is open, the airstream X penetrates the shutter system plane before coming into contact with the heat exchanger 36. As the airstream X reaches the heat exchanger 36, the coolant temperature inside the heat exchanger is reduced before the coolant is returned to the engine 34, to thereby cool the engine.

When the shutter system 10 is fully closed, louvers 12A-C and 14A-C provide blockage of the airstream X at the grille opening 32. When the shutter system 10 is fully opened, as shown in FIG. 3, each louver 14A-C is rotated to a position parallel to the airstream X seeking to penetrate the shutter system plane. Thus, a fully opened shutter system 10 is configured to permit a generally unfettered passage of such a stream through the louver plane. The shutter system 10 may also be regulated by controller 44 to variably restrict access of the oncoming airstream X to heat exchanger 36, by providing substantially synchronized rotation of louvers 12A-C and 14A-C via the flexible drive element 26 to an intermediate position. As understood by those skilled in the art, an intermediate position of shutter system 10 is where the louvers 12A-C and 14A-C are partially closed, thus controlling the amount of airstream X received by the heat exchanger 36. An appropriate intermediate position of louvers 12A-C is selected by the controller 44 according to a programmed algorithm to thereby affect the desired cooling of engine 34.

While the best modes for carrying out the invention have been described in detail, those familiar with the art to which this invention relates will recognize various alternative designs and embodiments for practicing the invention within the scope of the appended claims.

The invention claimed is:

1. A shutter system comprising:
a first louver element having a first pivot axis, wherein the first louver element is configured to rotate about the first pivot axis;
a second louver element having a second pivot axis, wherein the second louver element is configured to rotate about the second pivot axis and the second pivot axis is disposed at an angle that is other than 180 degrees relative to the first pivot axis; and
a flexible drive shaft operatively connecting the first louver element and the second louver element to thereby substantially synchronize the rotation of the first and second louver elements.

2. The shutter system of claim 1, further comprising a mechanism configured to select a position for the shutter system between and inclusive of fully opened and fully closed by rotating the first and second louver elements about the respective pivot axes.

3. The shutter system of claim 2, further comprising a controller configured to regulate the mechanism.

4. The shutter system of claim 3, wherein the shutter system is configured to control an airstream through a grille opening in a vehicle.

5. The shutter system of claim 4, wherein the vehicle includes an internal combustion engine, and the controller is configured to regulate the mechanism according to a load on the engine.

6. The shutter system of claim 5, wherein the engine is cooled by a fluid circulated through a heat exchanger, and the vehicle includes a sensor adapted to sense a temperature of the fluid and configured to communicate the temperature to the controller.

7. The shutter system of claim 6, wherein the controller is configured to regulate the mechanism to cool the fluid circulated through the heat exchanger according to the sensed temperature of the fluid.

8. A vehicle comprising:
an internal combustion engine cooled by a circulating fluid;
a heat exchanger configured to cool the fluid via an airstream after the fluid cools the engine;
a grille opening positioned to permit the airstream to pass through on the way to the heat exchanger; and
a shutter system for controlling an airstream through the grille opening, the shutter system including:
a first louver element having a first pivot axis, wherein the first louver element is configured to rotate about the first pivot axis;
a second louver element having a second pivot axis, wherein the second louver element is configured to rotate about the second pivot axis and the second pivot axis is disposed at an angle that is other than 180 degrees relative to the first pivot axis; and
a flexible drive shaft connecting the first louver element and the second louver element to thereby substantially synchronize the rotation of the first and second louver elements.

9. The vehicle of claim 8, further comprising a mechanism configured to select a position for the shutter system between and inclusive of fully opened and fully closed by rotating the first and second louver elements about the respective pivot axes.

10. The vehicle of claim 9, further comprising a controller configured to regulate the mechanism.

11. The vehicle of claim 10, wherein the controller is configured to regulate the mechanism according to a load on the engine.

12. The vehicle of claim 11, wherein the engine is cooled by a fluid circulated through a heat exchanger, and the vehicle includes a sensor to sense a temperature of the fluid and configured to communicate the temperature to the controller.

13. The vehicle of claim 12, wherein the controller is configured to regulate the mechanism according to the sensed temperature of the fluid.

* * * * *